(12) United States Patent
Aoki

(10) Patent No.: US 6,382,667 B1
(45) Date of Patent: May 7, 2002

(54) PASSENGER RESTRAINING PROTECTIVE APPARATUS

(75) Inventor: Hiroshi Aoki, Minato-ku (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 09/678,679

(22) Filed: Oct. 4, 2000

(30) Foreign Application Priority Data

Oct. 6, 1999 (JP) .......................................... 11-285214
Sep. 26, 2000 (JP) ...................................... 2000-292161

(51) Int. Cl.[7] .............................................. B60R 21/32
(52) U.S. Cl. ........................................ 280/735; 701/45
(58) Field of Search ............................ 280/735, 801.1; 180/273, 268; 297/216.11; 701/45

(56) References Cited

U.S. PATENT DOCUMENTS

| | | | |
|---|---|---|---|
| 3,633,697 A | * 1/1972 | Silver | 180/82 |
| 5,865,463 A | * 2/1999 | Gagnon et al. | 280/735 |
| 5,899,949 A | * 5/1999 | Kincaid | 701/45 |
| 5,954,360 A | * 9/1999 | Griggs, III et al. | 280/735 |
| 5,960,523 A | * 10/1999 | Husby et al. | 24/633 |
| 5,996,421 A | * 12/1999 | Husby | 73/862.451 |
| 6,092,838 A | * 7/2000 | Walker | 280/735 |
| 6,264,236 B1 | * 7/2001 | Aoki | 280/735 |

FOREIGN PATENT DOCUMENTS

| | | |
|---|---|---|
| FR | 2761032 | 9/1998 |
| GB | 2343043 A | 4/2000 |
| JP | 2000-127890 | * 5/2000 |
| WO | WO 98/51547 | 11/1998 |
| WO | WO 99/29538 | 6/1999 |

* cited by examiner

Primary Examiner—Eric Culbreth
Assistant Examiner—David R. Dunn
(74) Attorney, Agent, or Firm—Foley & Lardner (57) ABSTRACT

To detect the presence of the child seat being fixed on the seat, and to prohibit deployment of the air bag even in the case of collision. A seat sensor for detecting the value of the load applied on the seat, and a tension switch that detects tension applied on the seat belt and turns into the ON-state when the tension is in a certain range are provided. The air bag actuation deciding section determines whether it is in the state that the tension is below the lower threshold value and the tension switch is in the ON-state and the seat belt is attached to the buckle, or in the state that the tension switch is in the OFF-state and the sum of the seat weight obtained from the seat sensor and the increase of the weight due to the tension of the seat belt is not more than a prescribed weight. When the collision sensor detects a collision, a regulating control signal for the deployment of the air bag corresponding to the determination is supplied to the ignition unit.

8 Claims, 8 Drawing Sheets

PASSENGER RESTRAINING PROTECTIVE APPARATUS

FIELD OF INVENTION

The present invention relates to a passenger restraining protective device and, more specifically, to a passenger restraining protective device that determines the state of the younger passenger sitting on a child seat fixed on the seat or on a booster seat and regulates the actuation of the air bag according to the circumstances.

DESCRIPTION OF THE RELATED ART

In vehicles provided with an air bag as a passenger restraining protective device for the front passenger seat, the air bag is inflated and deployed upon collision to protect an adult passenger sitting on the front passenger seat from the secondary collision in the car. On the other hand, in case where a baby or infant seat, a child or toddler seat, or a booster seat is mounted on the front passenger seat and an infant or the like is using the front passenger seat, there may be a case where complete deployment of the air bag is not desirable for safety reasons. Therefore, realization of the system that determines the case where an infant or a child with the stature smaller than that for an average six year old child (for example) is sitting on the front passenger seat and, accordingly, decreases a force to deploy the air bag or prohibits the deployment itself is required.

Conventionally, there is a circuit that determines whether or not a passenger is sitting on the seat to serve as an alarm for reminding the passenger to fasten the seat belt. In this determination circuit, a seat sensor determines the weight applied on the seat and turns an alarm lamp on the instrument panel ON when the seat belt is not fastened yet.

The seat sensor is a known weight sensor mounted at the bearing position on the floor of the car body where the leg section of the seat is fixed. By performing a calibration of an empty weight in advance, the weight of the passenger seated on the seat or the baggage placed on the seat may be detected as a value of the load (hereinafter the load is referred to as a seat weight). On the other hand, whether or not the seat belt is appropriately fastened may be checked by the ON-state of the known buckle switch.

Figure 6A:
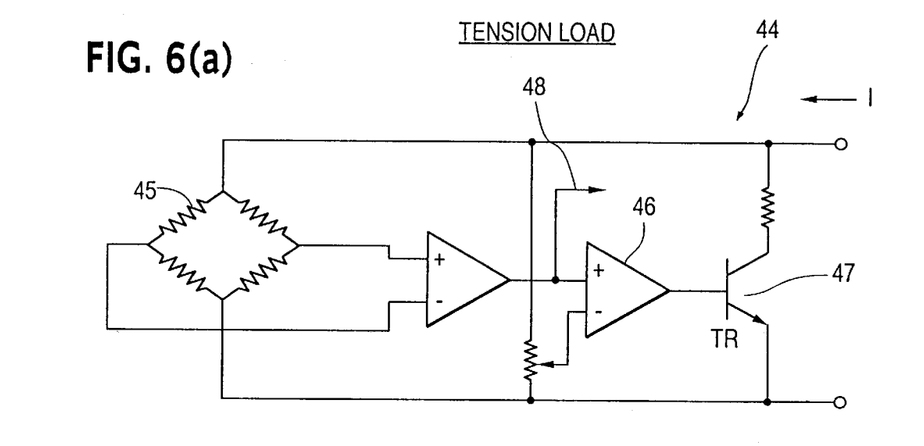
FIG. 6 is a schematic circuit drawing showing the circuit construction of the switch shown in FIG. 5.
Figure 8:
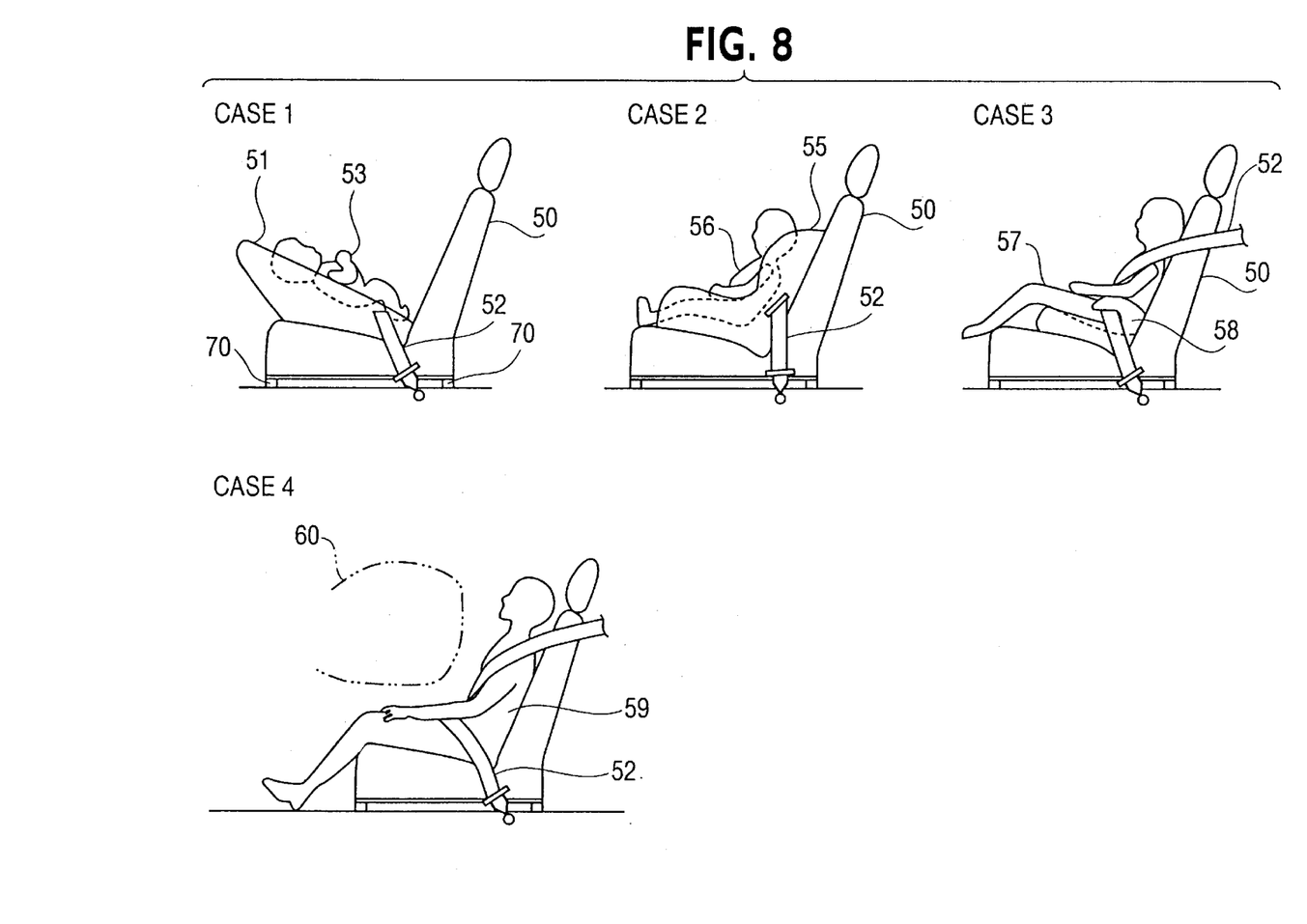
FIG. 8 is a schematically illustrated explanatory drawing showing the states of the passenger in which a passenger other than the adult is seated on the front passenger seat in various ways.

For example, the following circumstances may be considered as typical cases where the air bag should not be deployed. FIG. 8 is an explanatory drawing illustrating the state of the passenger in each case in a schematic manner connect. Case 1 shows a baby seat 51 is fixed on the seat 50 facing toward the rear with a seat belt 52, and a baby is lying thereon. Case 2 shows where a child seat 55 is fixed on the seat 50 with the seat belt 52 and an infant (approximately up to 4 years old) 56 is sitting thereon. Case 3 shows a booster seat 58 is placed on the seat 50 and an infant (approximately up to 6 years old) 57 is sitting thereon with the seat belt 52 fastened. It is desirable to deploy the air bag 60 when an elementary school age child of a fourth grade or higher/or a small-statured adult (approximately 48 kg in weight) 59 is sitting on the seat with the seat belt 52 fastened (Case 4). Therefore, in order to discriminate Cases 1 to 3 and Case 4, the seat weight obtained by the seat sensor 70 (See FIG. 6) is used a basic variable. The average values of the seat weight are shown in the upper column of the Table 1 (when the seat belt is not yet fastened).

TABLE 1

Seat Weight List (When the Belt is Fastened) (kg)

|  | 1. Baby Seat | 2. Child Seat | 3. Booster Seat | 4. Small-Statured Adult |
|---|---|---|---|---|
| Seat weight (belt not fastened) | 15 | 23 | 25 | 48 |
| Seat weight (belt fastened) | 22 | 30 | 27 | 48–50 |

As shown in Case 2, the child seat is fastened on the seat with a seat belt, and one end of the lap belt of the seat belt is anchored to the floor of the car body. In the seat having such a structure, a belt tension generated when the seat belt is securely fastened presses the child seat from above against the surface of the car seat. Therefore, a downward force toward the car seat increases the seat weight correspondingly. In general, the belt tension is about 10 kgf for a child seat, and 2 kgf for a booster seat, which is almost the same as the case when the seat belt is fastened. The expected seat weights, which are to be increased by the belt tension, are approximately 7 kg and 2 kg respectively. The total weights applied to the car seat are shown in the lower columns (when the seat belt is fastened) of Table 1.

Therefore, as a normal determination, the circumstances of the front passenger seat when the deployment of the air bag should be controlled may be grasped by setting the threshold value of the seat weight to the value between 30 kg and 35 kg. In this case, a known tension switch for detecting the belt tension is used in addition to the seat sensor. The control circuit of the tension switch can maintain the upper and lower threshold values T by setting the same and setting the state of operation as appropriate.

It has been shown that the belt tension of the seat belt used when fixing the child seat onto the car seat differs depending on the configuration of the child seat or the seat body, or on the state of attachment. When the child seat is secured with the seat belt tightly fastened, the belt tension may exceed 10 kg. In this case, the seat weight with an infant sitting thereon may exceed 30 kg. The detected tension may vary by the vibration during driving operation. Therefore, in the method of determination of the state of the passenger as described above, the state of the front passenger seat cannot be determined accurately.

In addition, it may cause a phenomenon similar to the chattering by the vibration associated with the driving operation of the vehicle.

SUMMARY OF THE INVENTION

Accordingly, it is an object of the present invention to solve the problems of the related art as described above, and to provide a passenger restraining protective device in which a tension switch is used for determining the state of the passenger sitting on the front passenger seat, and an accurate determination can be made based on seat weight information and information obtained from the tension switch to control whether or not the air bag is to be ignited.

In order to achieve the object described above, the present invention comprises a seat sensor for detecting the load value acting upon the seat, and a tension switch for detecting tension acting on the seat belt and being turned ON when the tension exceeds the threshold value, wherein a control signal for regulating the air bag deployment is supplied when the passenger state is such that the tension exceeds the threshold value and the tension switch is in the ON-state, or that the seat weight obtained from the seat sensor with the switch in the OFF-state is not more than the prescribed weight. Accordingly, the state in which the child seat or the like is fixed on the seat by the seat belt is detected so that the air bag deploying action upon collision is adequately controlled.

In this case, preferably, the tension switch is turned ON when the tension of the seat belt is between 3 kgf and 20 kgf. Accordingly, the air bag deployment is reliably realized when the seat belt is normally used by an adult passenger or the like.

Preferably, the first determined value is obtained by the equation W=αX+Y, where, W: first evaluation value α: a conversion factor of the seat load X: tension load of the tension switch (<threshold value)

Y: threshold value of the seat weight, and the first evaluation value is varied with tension. Accordingly, the errors in weight measurement by the seat sensor or the like caused by tension of the seat belt can be compensated and the accuracy of determination of the state of the passenger by weight measurement can be improved.

Preferably, when the tension switch is in the ON-state and the seat weight is not less than 50 kg, which is set as a second determination value, the regulating control signal is corrected and supplied to execute the deployment of the air bag. Accordingly, malfunction such as a cutoff of air bag for an adult passenger due to failure of the tension switch may be prevented.

Preferably, the regulating control signal is a signal for prohibiting the deployment of the air bag or a signal to decrease the speed of the deployment. Accordingly, the air bag deploying action for a child passenger sitting on the seat is adequately set in advance.

Preferably, the output signal representing the ON-state of the tension switch is effective only when the buckle switch is in the ON-state. Accordingly, non-operation of the air bag due to malfunctioning of the tension switch when the seat belt is not being used is prevented and a diagnosis of failure of the tension switch can be realized.

Preferably, the ON-state of the tension switch is accepted after a prescribed period of holding state. Accordingly, non-operation of the air bag due to chattering of the tension switch caused by the instantaneous change of posture of the passenger can be prevented.

DETAILED DESCRIPTION OF THE PREFERRED EMBODIMENT

Referring now to the drawings, an embodiment of the passenger restraining protective device of the present invention will be described.

Figure 1:
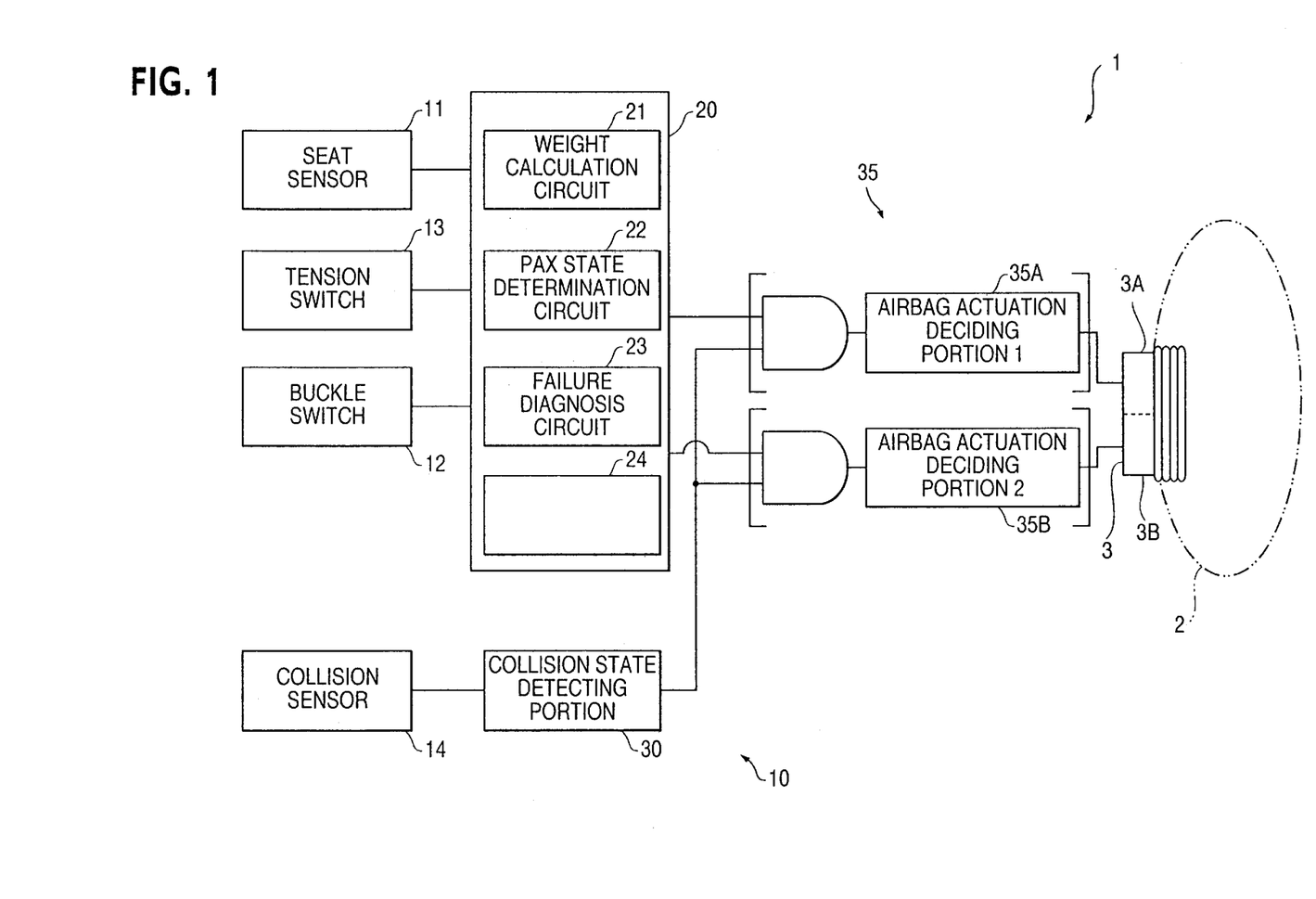
FIG. 1 is a schematic block diagram of the passenger restraining protective device according to the present invention.

FIG. 1 is a schematic block diagram of the passenger restraining protective device 1 of the present invention. As shown in the same figure, the passenger restraining protective device 1 comprises an air bag 2 for the front passenger seat, a known ignition unit 3 for supplying gas to the air bag 2 so that the air bag 2 is inflated and deployed, and a controlling section 10 that can supply the actuation command to prohibit the ignition unit 3 from igniting even in the case of collision depending on the state of the passenger sitting on the front passenger seat.

The controlling section 10 comprises a seat sensor for quantitatively detecting the weight of the passenger on the seat, a buckle switch 12 for detecting whether the tongue of the seat belt is normally attached to the buckle, a tension switch 13 for quantitatively detecting tension applied to the seat belt when the passenger is seated on the seat with the seat belt fastened or the child seat is fixed on the seat by the seat belt and holding the circuit in the ON- or OFF-state, a passenger state determining function 20 for determining whether or not the air bag 2 should be ignited based on ON-OFF information of the tension switch 13 and the output signal supplied from the seat sensor 11, a collision state detecting circuit 30 for supplying the actuation signal to the ignition unit 3 of the air bag 2 when the collision sensor 14 detects the collision state at or above the prescribed level, and an air bag ignition unit actuation deciding circuit 35 for determining whether or not the actuation signal should be fed to the ignition unit 3 for inflating and deploying the air bag based on information obtained from the passenger state determining function 20 and the collision state detecting circuit 30.

The constructions of these individuals and the algorithm for determining the state of the passenger at the passenger state determining function 20 will now be described.

In this embodiment, a known weight sensor being interposed between the seat rail for supporting the seat so that the seat can be moved forward and backward and the floor surface is used as a seat sensor 11. The distortion of the supporting member that is deformed according to the load applied to the seat surface is measured, and the measured value is fed to the passenger state determining function 20.

The buckle switch 12 is a known switch in which the contact point turns ON when the engaging lag formed on the latch plate of the buckle is securely latched to the engaging hole formed on the tongue plate of the seat belt inserted from the insertion opening of the buckle. By employing this switch, for example, the alarm lamp on the instrument panel, not shown, can be turned ON to represent the state that the seat belt is not fastened.

In this embodiment, the tension switch 13 is an electric switch that is turned ON when the value crosses the threshold value depending on the setting of the circuit level. As a tension detecting function, an analog circuit (FIG. 6(a)) is employed in which the comparator compares the output from the distortion gauge that constitutes a bridge attached to the latch plate in the buckle described later (FIG. 5) with the threshold value T and a digital circuit (FIG. 6(b), FIG. 7) in which the compared value is converted into a digital value so as to be used at the passenger state determining function 20.

The passenger state determining function 20 comprises a weight calculating circuit 21, a passenger state determining circuit 22, a failure diagnosis circuit 23, and a chattering prevention circuit 24, wherein the signals representing whether or not the ignition unit 3 for inflating the air bag should be actuated is sent from the passenger state determining circuit 22 to the air bag ignition unit actuation deciding circuit 35.

The construction of each circuit and the algorithm of the passenger state determining function 20 will now be described.

The weight calculating circuit 21 converts the distortion data sent from the seat sensor 11 into the load value and detects the net weight of the passenger seated on the seat or the baggage placed on the seat. Since the passenger is generally seated with his or her feet placed on the floor, it is also possible to take the fore-and-aft balancing of the body weight and the weight that is transmitted from the feet to the floor and reduced correspondingly into account by providing a seat sensor at the front and rear section of the seat.

A failure diagnosis circuit 23 is integrated for ensuring reliability of the circuit (see FIG. 1). In case where the tension switch is ON when the buckle switch is OFF (when the tongue is not fixed), as an example of failure, an alarm representing the abnormal use or failure is supplied. Breakage of the tension switch can be found by supplying a bias current in the circuit and diagnosing the change in the current. When the diagnosis circuit finds the breakage or the like, the value of the tension switch is preferably ignored and not used for determining the state of the passenger. The switch contact may be either the mechanical contact or the electrical non-contact, and preferably, a diagnosis circuit is provided in order to enhance the reliability of the circuit. In this case, the diagnosis circuit is preferably constructed as a diagnosing means in such a manner that the ON- and OFF-states of the contact point have an effect on the bias current, and the state of the effected bias current is diagnosed.

A chattering preventing circuit 24 is provided for stabilizing the operation of the circuit (see FIG. 1). For example, even when an adult passenger is sitting on the front passenger seat with the seat belt fastened, there is a case where tension of the seat belt increases instantaneously due to braking or movement of the passenger during operation and thus the tension switch comes on. This ON-state does not continue stably for a long time, but becomes the chattering state. On the other hand, there is a case where the tension switch comes OFF instantaneously due to vibrations in operation even when the child seat is fixed on the seat by the seat belt. This circuit works to prevent such a chattering. In the present invention, the circuit is constructed in such a manner that the state of the switch becomes effective after that state is held as a practical action for about ten seconds. When the unstable state persists for a long time, the condition before the state of the switch became unstable is preferably maintained. It is also possible to determine the state of the passenger from the seat weight under the condition where the switch is in the OFF state. When the tongue of the seat belt is not fixed to the buckle, the belt tension cannot be detected accurately, and the value has no effect on the seat weight. Therefore, the circuit structure in which the ON-OFF state of the tension switch is effective for determining the state of the passenger only when the buckle switch is in the ON-state (when the tongue is fixed) is also applicable and enhances reliability.

Figure 2:
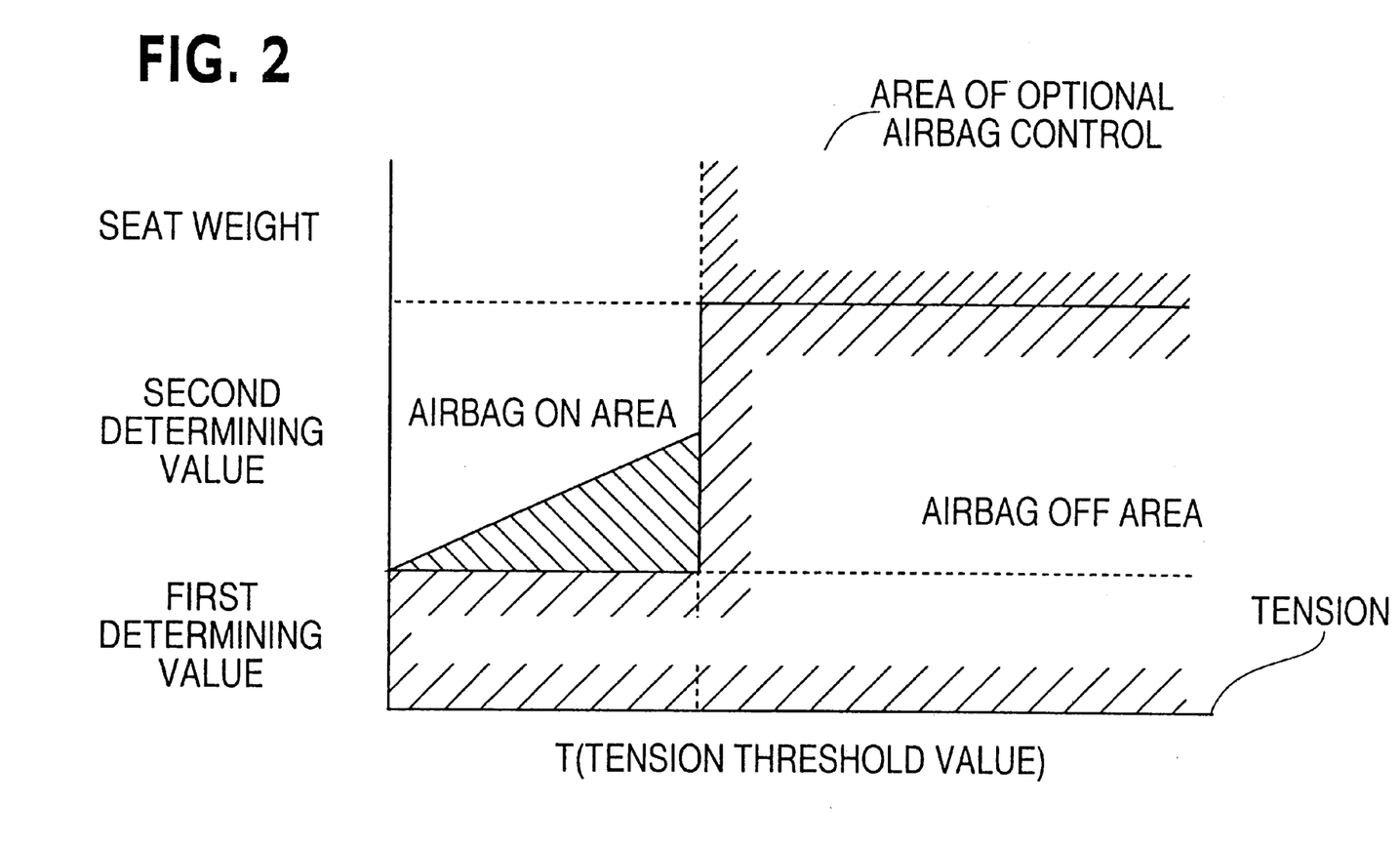
FIG. 2 is a drawing showing the relation between the tension and seat load which is a basis of the determination algorithm of the passenger state determination function.

In the passenger state determining circuit 22, whether or not the output of the air bag deployment action signal is possible is determined according to the determination algorithm integrated in advance. FIG. 2 is a schematic perspective view showing the determination algorithm of the passenger state determination circuit 22 in relation between the detected value of the tension switch 13 and the seat weight. As shown in the figure, the tension switch 13 is held in the OFF-state when detected tension is below the threshold value T as a borderline, and the tension switch 13 is held in the ON-state when it is not less than the threshold value T, and the air bag is held in the OFF-state. On the other hand, when the seat weight is not more than the first determined value, the air bag is set to the OFF-state. In this case, the first determination value may be a constant value (W−Y), or may be a prescribed linear function (W=αX+Y). Even when the seat weight is not less than the second determination value, if the detected tension is not less than the threshold value T of the tension switch 13, the output for deploying the air bag is controlled from the air bag ON state as an optional air bag control.

The determination algorithm shown in FIG. 2 will now be described using the specific values. First, the setting of the threshold value T of the tension switch 13 will be described. In this embodiment, the threshold value T of the tension switch 13 is set to 3 kgf because it is known that the average tension is not more than 3 kgf when the adult passenger is wearing the seat belt, considering the performance of the retractor and the limit of patience of the passenger. Therefore, when the belt tension is about 3 kgf or higher with the tongue of the seat belt fixed to the buckle, it is considered that there is no adult passenger sitting on the seat, but that the tension is generated by a child seat or some other fixed object interposed. In such a case, it is generally determined that a child seat or a baggage or the like is present on the front passenger seat. On the other hand, when the value is below the threshold value T, the tension switch 13 is held in the OFF-state. However, in this situation, the state of the passenger may be determined by setting the threshold value of the seat weight to approximately 30 kg as shown in Table 1. The first determination value may be a constant value or a linear function shown in the following equation.

The first determination value of the seat weight may be calculated by the equation below.

$$W = \alpha X + Y \qquad \text{(Equation 1)}$$

where,
  W: first evaluation value
  α: a conversion factor of the seat load
  X: tension load of the tension switch
  Y: threshold value of the seat weight In the equation shown above, the conversion factor of the seat load a is employed for converting into the threshold value of the tension. In general, it is known that the conversion factor of the seat load α varies depending on the positional relationship between the seat and the point where the seat belt (lap outer) is fixed, the form in which the child seat is fixed and the position where the tension switch is installed. As an estimated range of variation, the following range may be assumed. In X and Y of Equation 1, variations in values detected by the tension switch 13 and the seat sensor 11 are preferably taken into account.

Figure 3A:
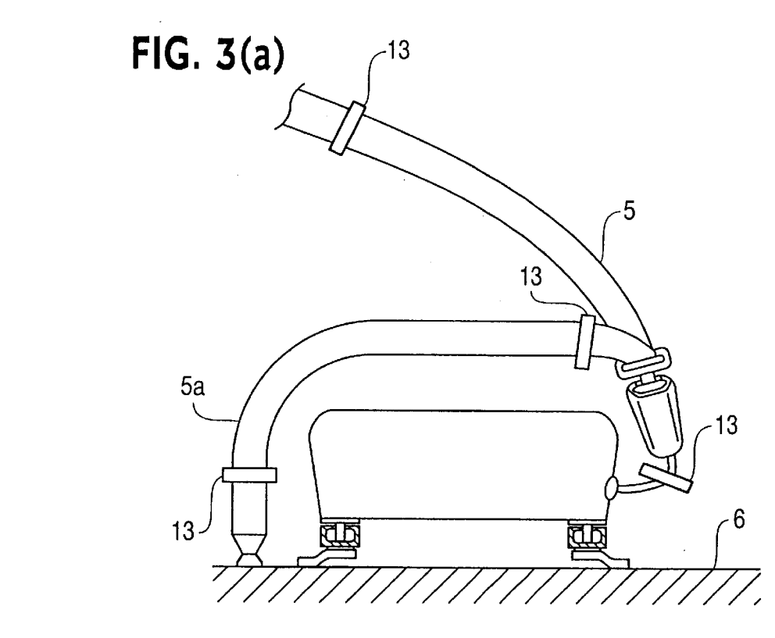
FIG. 3 is a schematic flow chart showing an example of the determination algorithm set forth in FIG. 2.
Figure 3B:
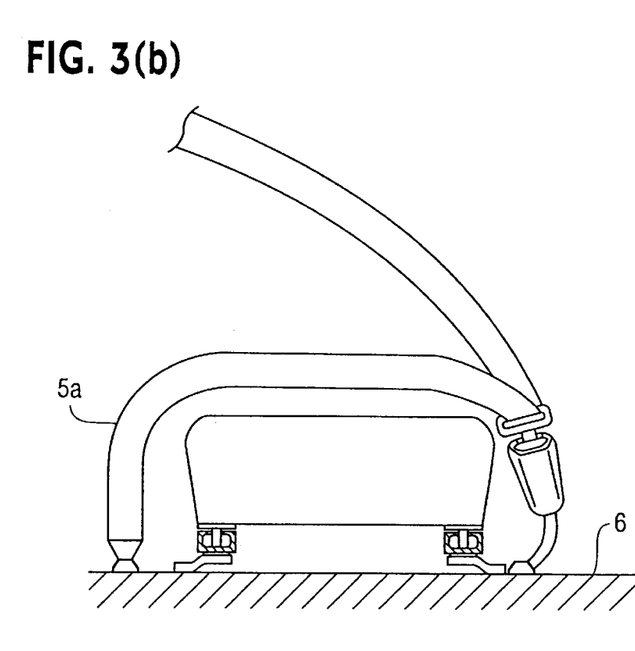

FIG. 3 is a schematic diagram showing the installation of the various seat belts 5 and the relation between the mounting positions of the tension switch 13 and the conversion factor of the seat load α. As shown in the same figure, when the tension switch 13 is mounted on the lap outer 5a of the seat belt 5 and the lap outer 5a is directly fixed to the floor 6 of the car body (FIG. 3(a)), the conversion factor of the seat load α is α=0.2 to 0.9. On the other hand, when both ends of the lap outer 5a are fixed directly to the vehicle (FIG. 3(b)), the value of α is twice the former case and α=0.4 to 1.8.

Accordingly, the three cases described above (1 to 3) can be discriminated by determining the state of the passenger whether the tension switch 13 is in the ON-state or the tension switch is in the OFF-state and the seat weight is not more than the threshold value. In these three cases, the setting is such that the air bag 2 is not deployed for the safety of the infant or the like even when the collision occurred and the collision state detecting signal is supplied. Therefore, the ignition unit actuation deciding section 35 of the air bag 2 can execute the ON-OFF control according to the result of the passenger state determination.

Figure 4:
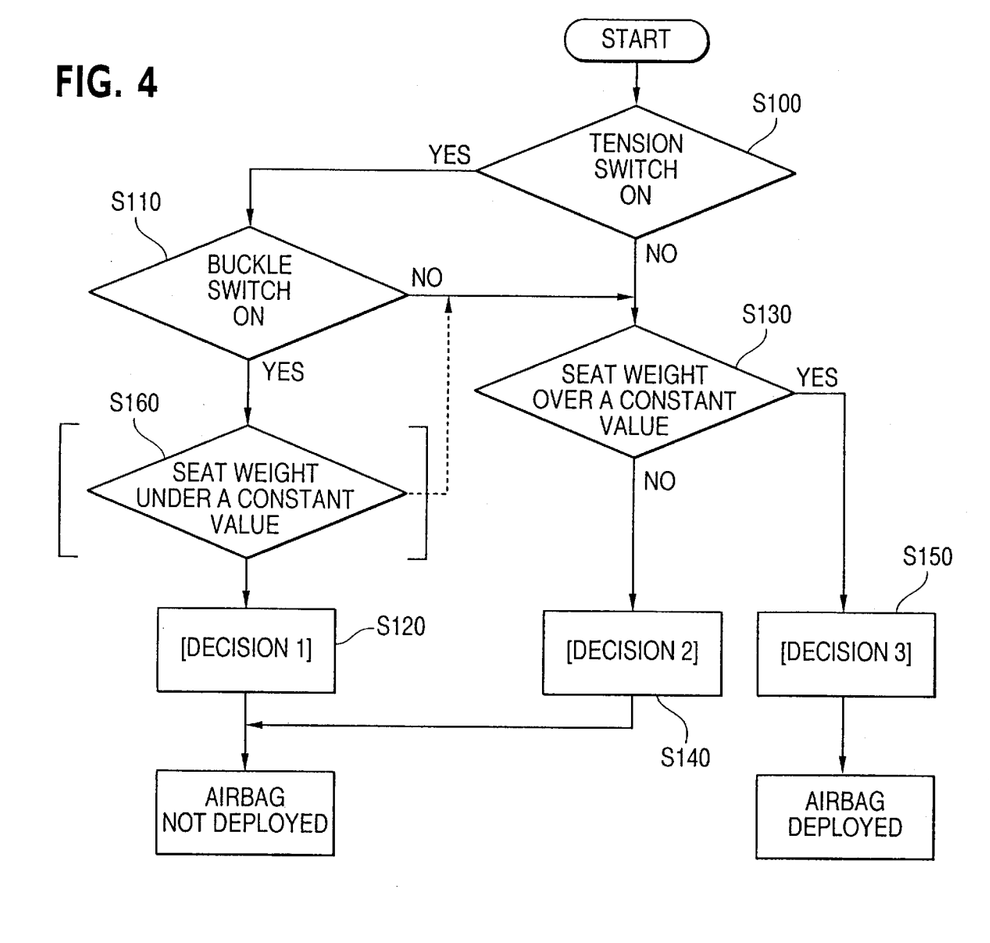
FIG. 4 is a flow chart showing an example of deployment of the determination algorithm at the passenger state determining function shown in FIG. 2.

FIG. 4 is a schematic flow chart showing the deployment of the determination algorithm shown in FIG. 2. As shown in FIG. 2, when the detecting tension is not less than the threshold value T, the tension switch is turned to the ON-state (step 100: S100). When the buckle switch 12 is determined to be in the ON-state (step 110: S110), it is determined that the seat belt is used for fixing the object other than the passenger, for example, a child seat or the like. In this case, since an adult passenger is not sitting on the seat, the ignition prohibiting signal is supplied to the air bag ignition unit actuation deciding section 35 ([decision 1] (step 120: S120)). When the detected tension is not more than the threshold value T, the switch is in the OFF-state, and the seat weight detected by the seat sensor is not more than 30 kg (step 130: S130), the ignition prohibiting signal is supplied to the air bag ignition unit actuation deciding section 35 ([decision 2] (step 140: S140)).

In such cases, the ignition unit actuation deciding section 35 determines that the air bag should not be deployed even when the critical collision information is received and the collision state signal is supplied from the collision state detecting section 30. On the other hand, when the seat weight exceeds 30 kg, it is determined that the passenger has such a stature that it is desired to be restrained by deploying the air bag 2 (an elementary school age child of a fourth year or higher, or a small-statured adult) ([decision 3, (step 150: S150)]). It is preferable to add the option in which control is made in such a manner that when it is found that the seat weight exceeds 50 kg before making [decision 1], it is determined that an adult is sitting on the seat even when the tension switch 13 is in the ON-state, and the air bag 2 is deployed (step 160: S160).

FIG. 1 also shows the air bag system in which the quantity of gas introduced into the air bag 2 is changeable in two stages. When applying the passenger state determination algorithm to this air bag system, the stepwise threshold values are applied to the seat weight, and the [decision 3] is made in two stages of a deciding section 1 (35A) and a deciding section 2 (35B). In other words, control is made in such a manner that when the tension switch 13 is in the ON-state or when the seat weight is not more than 20kg, the deployment of the air bag is prohibited, and when the seat weight is not more than 20 kg, the deployment of the air bag is prohibited, and when the seat weight is between 20 and 30 kg, the air bag 2 is deployed with smaller quantity of gas injection by the first ignition unit 3A. It is also possible to control the ignition unit 3 in such a manner that when an adult passenger is detected to be sitting on the seat, the second ignition unit 3B is ignited to inject full quantity of gas so that the deployment of the air bag 2 is maximized. Another option that controls to inject a small quantity of gas by the first ignition unit 3A to deploy the air bag 2 when the seat weight is not less than 40 kg even when the tension switch is in the ON-state, and to inject full quantity of gas when it is not less than 50 kg is also preferable.

In each decision [decision 1 to 2] described above, the prohibition of an air bag ignition signal is instructed, while in the case where the reduction of the deployment speed is possible owing to the structure of the ignition unit, the corresponding control signals may be supplied.

An embodiment of the passenger state determination by the use of the equation for obtaining the seat weight determining value W (Equation 1) is described.

When detecting the child seat passenger (infant) of 25 kg in total weight.

Assuming that the seat belt tension is 7 kg, and the conversion function of the seat load α=0.7, from (Equation 1), W=0.7×7+25=29.9. The first evaluation value is increased to W=29.9 kg, thereby detecting the child seat passenger of 25 kg in total weight. In this case, where Y=28 kg, and α=0.9 taking variations in the values obtained from the seat sensor into account, the evaluation value is approximately W=34.3 kg. When detecting the total weight applied on the seat, α=0.6–0.9 is suitable value when the seat belt is one-end fixed type, and thus the evaluation value is W=30 kg–38 kg.

In the method of detecting the seat weight as described thus far, the threshold value of the ON-OFF state of the tension switch may be as much as about 20 kgf, and both of the threshold value of tension and the seat weight evaluation value W can be set even when the value of α is significantly changed. The position to insert the tension switch 13 may be, as shown in FIG. 3(a), a part of the lap inner 5b and of the shoulder belt 5c. In such a case, additional calibration using another conversion factor α' is required.

Figure 5:
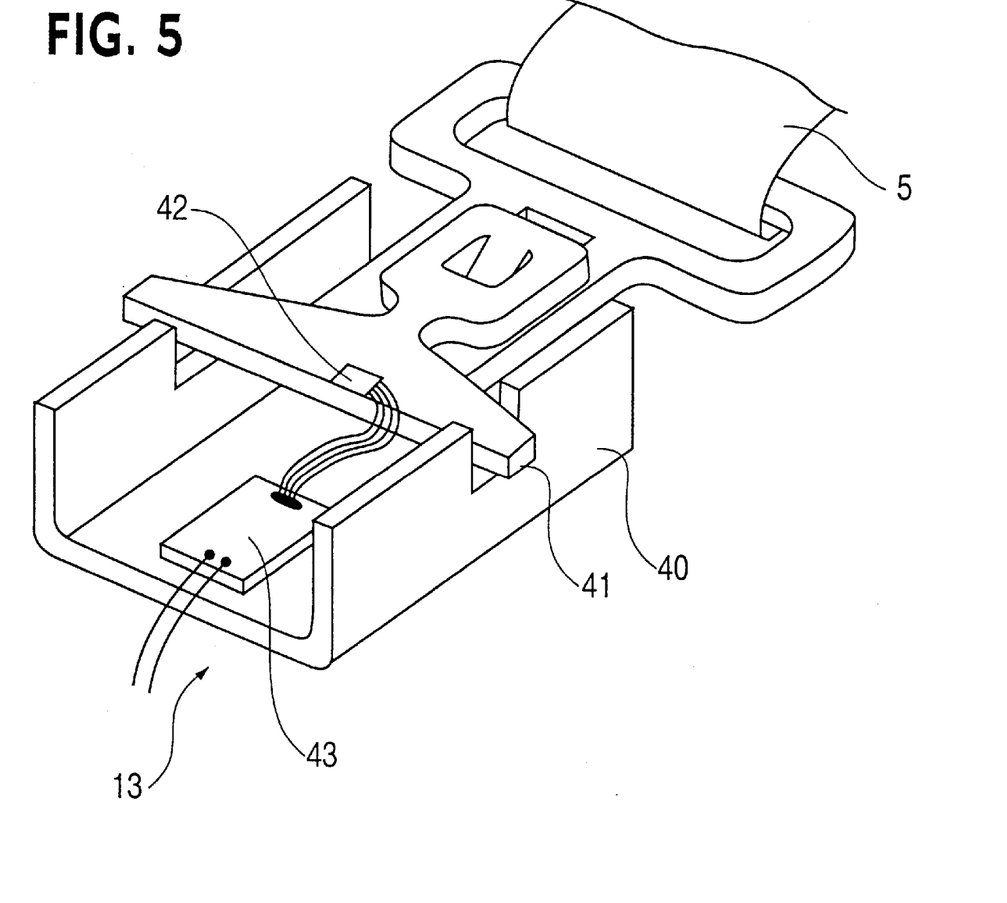
FIG. 5 is a schematic perspective drawing showing an example where the tension switch is mounted in the buckle.

Each tension switch 13 may be integrated into the member of the latch mechanism on the buckle, but not on a part of the seat belt. FIG. 5 is an example in which the load cell 42 (bridge comprising a distortion gauge) is attached on the latch plate 41 of the main frame 40 in the buckle unit, and the distortion load is converted as belt tension so that the value of distortion load due to variations thereof is controlled to be ON and OFF by a constant threshold value.

Figure 6B:
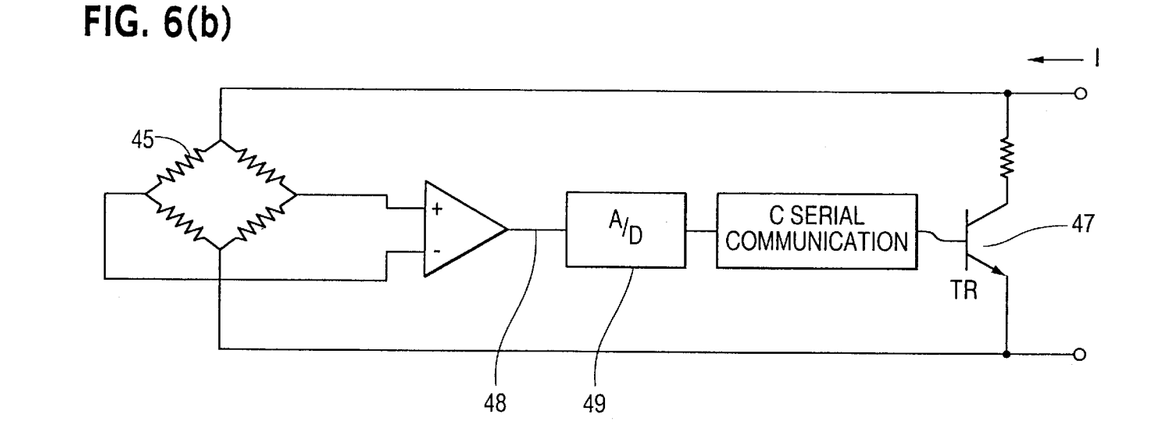
Figure 7:
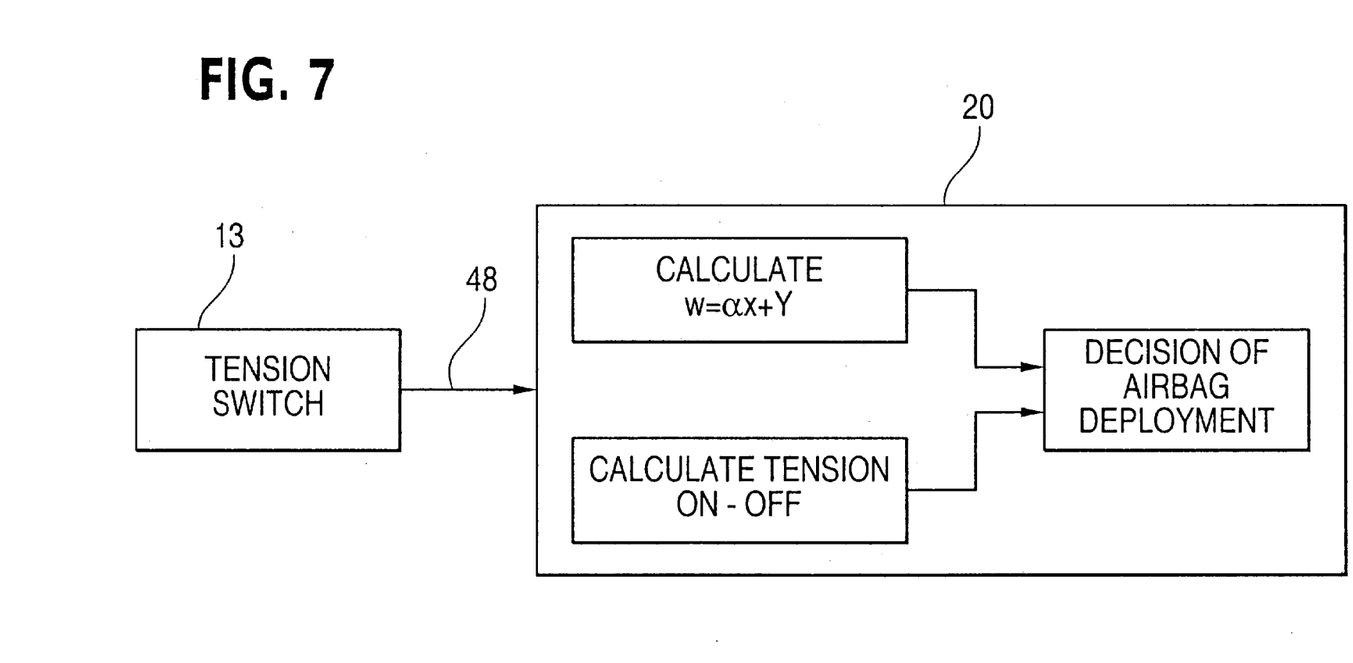
FIG. 7 is a block diagram showing the determination and processing in the passenger state determination function by the use of the tension load.

In this tension switch 13, equipment can be downsized by integrating the circuit structure 44 shown in FIG. 6 into the circuit board 43. In the circuit structure 44, variations in detected electric current I flowing in the circuit caused by variations in resistance in the bridge circuit 45 provided in the circuit are obtained, and the obtained value is compared with the preset threshold value at the comparator 46, and the transistor 47 in the circuit functions as a tension switch in which tension load 48 is derived. FIG. 6(b) shows an example in which the compared tension load 48 is converted into a digital value via an A/D converter 49 for data processing. The digital data (tension load 48) is supplied to the passenger state determining section 20 via a communication path C through a serial port, as shown in FIG. 7 to be used for the calculation of the first determination value (for example, W=αX+Y). It is also possible to calculate the ON-OFF state of the tension switch 13 from the relation to the tension load threshold value T.

As is described thus far, the state of the passenger, such that an infant or the like is sitting on the front passenger seat using a child seat or the like, can be grasped accurately, so that the air bag is controlled not to be deployed in case of a collision with an infant or the like seated to prevent the accident by deployment of the air bag from occurring.

While the invention has been described in detail and with reference to specific embodiments thereof, it will be apparent to one skilled in the art that various changes and modifications can be made therein without departing from the scope of the invention.

We claim:

1. A passenger restraining protective device comprising:
   a seat sensor for detecting a value of a load applied to a seat, and
   a tension switch for detecting a tension applied to a seat belt and being turned ON when the tension exceeds a threshold value, wherein a control signal for regulating an air bag deployment is supplied when a passenger state is such that the tension exceeds the threshold value and the tension switch is in the ON-state, or that the load obtained from the seat sensor with the tension switch in an OFF-state is not more than a first evaluation weight,
   wherein the tension switch is turned ON when the tension of the seat belt is between 3 kgf and 20 kgf.

2. A passenger restraining protective device comprising:
   a seat sensor for detecting a value of a load applied to a seat, and
   a tension switch for detecting a tension applied to a seat belt and being turned ON when the tension exceeds a threshold value, wherein a control signal for regulating an air bag deployment is supplied when a passenger state is such that the tension exceeds the threshold value and the tension switch is in the ON-state, or that the load obtained from the seat sensor with the tension switch in an OFF-state is not more than a first evaluation weight,
   wherein the first evaluation weight is obtained by an equation $W = \alpha X + Y$, where, W: the first evaluation weight;

$\alpha$: a conversion factor of the seat load;

X: the tension of the tension switch (<threshold value); and,

Y: a threshold value of the seat load.

3. The passenger restraining protective device of claim 2, wherein when the tension switch is in the ON-state and the seat load is not less than a second evaluation weight that is larger than the first evaluation weight, the regulating control signal is not supplied, thereby enabling the deployment of the air bag.

4. The passenger restraining protective device of claim 2, wherein the regulating control signal is a signal for prohibiting the deployment of the air bag.

5. The passenger restraining protective device of claim 2, wherein an output signal representing the ON-state of the tension switch is effective only when a buckle switch is in an ON-state.

6. The passenger restraining protective device of claim 2, wherein the ON-state of the tension switch is accepted after a prescribed holding period.

7. The passenger restraining protective device of claim 2, wherein the regulating control signal is a signal to decrease the deployment speed of the air bag.

8. The passenger restraining protective device of claim 2, wherein the tension switch is turned ON when the tension of the seat belt is between 3 kgf and 20 kgf.

* * * * *